(12) United States Patent
Broden

(10) Patent No.: US 7,258,021 B2
(45) Date of Patent: Aug. 21, 2007

(54) PROCESS TRANSMITTER ISOLATION ASSEMBLY

(75) Inventor: David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/388,273

(22) Filed: Mar. 24, 2006

(65) Prior Publication Data

US 2006/0162458 A1    Jul. 27, 2006

Related U.S. Application Data

(63) Continuation-in-part of application No. 10/876,816, filed on Jun. 25, 2004, now Pat. No. 7,036,381.

(51) Int. Cl.
     *G01L 15/00*    (2006.01)
(52) U.S. Cl. .......................... 73/756; 73/716
(58) Field of Classification Search ............... 73/716, 73/718, 756; 361/283.1
See application file for complete search history.

(56) References Cited

U.S. PATENT DOCUMENTS

| | | | | |
|---|---|---|---|---|
| 4,833,922 A | * | 5/1989 | Frick et al. ................. | 73/756 |
| 4,970,898 A | | 11/1990 | Walish et al. ............... | 73/756 |
| 5,094,109 A | * | 3/1992 | Dean et al. ................. | 73/718 |
| 5,524,492 A | | 6/1996 | Frick et al. ................ | 73/706 |
| 5,668,322 A | * | 9/1997 | Broden ...................... | 73/756 |
| 5,731,522 A | | 3/1998 | Sittler ...................... | 73/708 |
| 5,920,016 A | * | 7/1999 | Broden ...................... | 73/756 |
| 6,059,254 A | * | 5/2000 | Sundet et al. .............. | 248/678 |
| 6,484,585 B1 | | 11/2002 | Sittler et al. .............. | 73/718 |
| 6,539,808 B2 | | 4/2003 | Saenz et al. ................ | 73/756 |
| 6,561,038 B2 | * | 5/2003 | Gravel et al. .............. | 73/729.2 |
| 6,675,655 B2 | * | 1/2004 | Broden et al. .............. | 73/716 |
| 6,883,380 B2 | | 4/2005 | Romo ....................... | 73/729.2 |

FOREIGN PATENT DOCUMENTS

| | | |
|---|---|---|
| EP | 0 306 189 A2 | 8/1988 |
| EP | 1 255 099 A2 | 11/2002 |
| JP | 11094671 | 4/1999 |
| WO | WO96/27124 | 9/1996 |
| WO | WO 2004/097361 | 11/2004 |

OTHER PUBLICATIONS

International Search Report and Written Opinion from Application No. PCT/US2005/021151 with international filing date of Jun. 15, 2005.

* cited by examiner

*Primary Examiner*—Andre J Allen
(74) *Attorney, Agent, or Firm*—Westman, Champlin & Kelly, P.A.

(57) ABSTRACT

An isolation assembly for connection to a process transmitter and for mitigating high temperature effects of a process fluid includes a process coupling face having an isolation diaphragm configured to contact process fluid. A transmitter coupling has a pressure coupling configured to couple to a pressure port of the process transmitter. A temperature isolation fluid conduit extends between the process coupling face and the transmitter coupling and carries an isolation fluid which couples a pressure applied to the isolation diaphragm to the pressure coupling to minimize high temperature effects of the process fluid on the process transmitter.

21 Claims, 4 Drawing Sheets

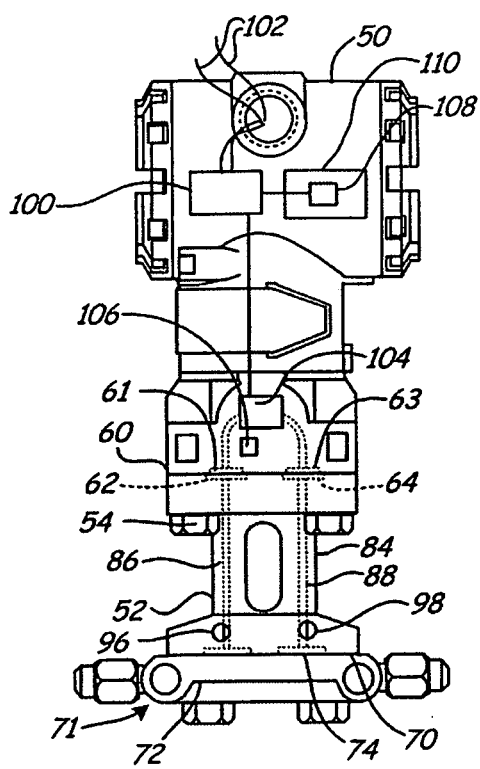
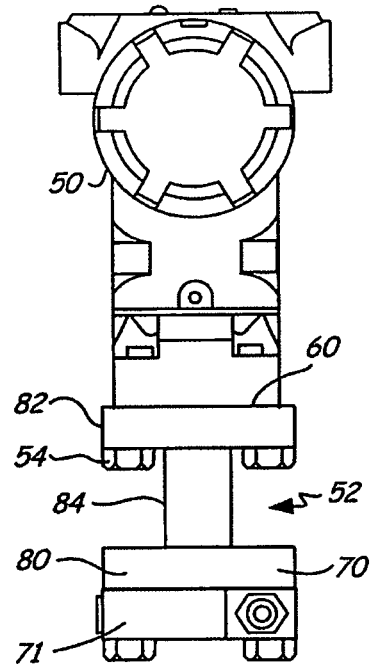
Fig. 2A         Fig. 2B
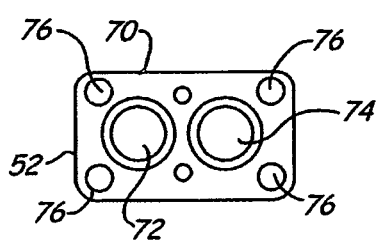
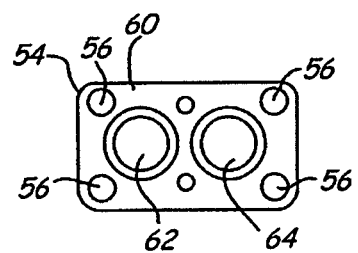
Fig. 2C         Fig. 2D

PROCESS TRANSMITTER ISOLATION ASSEMBLY

The present application is a Continuation-In-Part and claims the benefit of U.S. patent application Ser. No. 10/876,816, filed Jun. 25, 2004, now U.S. Pat. No. 7,036,381 the contents of which are hereby incorporated by reference in their entirety.

BACKGROUND OF THE INVENTION

The present invention relates to process control transmitters of the type used in industrial process monitoring and control systems. More specifically, the present invention relates to transmitters which measure process variables in high temperature environments.

Process monitoring and control systems are used to monitor and control operation of industrial processes. Industrial processes are used in manufacturing to produce various products such as refined oil, pharmaceuticals, paper, foods, etc. In large scale implementations, these processes must be monitored and controlled in order to operate within the desired parameters.

"Transmitter" has become a term which is used to describe the devices which couple to the process equipment and are used to sense a process variable. Example process variables include pressure, temperature, flow, and others. Frequently, a transmitter is located at a remote location (i.e., in the "field"), and transmits the sensed process variable back to a centrally located control room. Various techniques are used for transmitting the process variable including both wired and wireless communications. One common wired communication technique uses what is known as a two wire process control loop in which a single pair of wires is used to both carry information as well as provide power to the transmitter. One well established technique for transmitting information is by controlling the current level through the process control loop between 4 mA and 20 mA. The value of the current within the 4-20 mA range can be mapped to corresponding values of the process variable. Example digital communication protocols include the HART® protocol in which a digital signal is superimposed upon an analog 4-20 mA signal, a FIELDBUS protocol in which only digital communication is employed, Profibus communication protocol, wireless protocol, or others.

One type of transmitter is a pressure transmitter. In general, a pressure transmitter is any type of a transmitter which measures a pressure of a fluid of the process. (The term fluid includes both gas and liquids and their combination.) Pressure transmitters can be used to measure pressures directly including differential, absolute or gauge pressures. Further, using known techniques, pressure transmitters can be used to measure flows of the process fluid based upon a pressure differential in the process fluid between two locations.

Typically, a pressure transmitter includes a pressure sensor which couples to the pressure of the process fluid through an isolation system. The isolating system can comprise, for example, a isolation diaphragm which is in physical contact with the process fluid and an isolation fill fluid which extends between the isolation diaphragm and the pressure sensor. The fill fluid preferably comprises a substantially incompressible fluid such as an oil. As the process fluid exerts a pressure on the isolation diaphragm, changes in the applied pressure are conveyed across the diaphragm, through the isolation fluid and to the pressure sensor. Such isolation systems prevent the delicate components of the pressure sensor from being directly exposed to the process fluid.

In some process environments, the process fluid may experience relatively high temperatures. However, transmitters typically have a maximum operating temperature of 250-300° F. Even in cases where the transmitter can withstand the high temperature, temperature extremes can still cause errors in pressure measurements. In processes which have temperatures which exceed the maximum temperature of the pressure transmitter, the transmitter itself must be positioned remotely from the process fluid and coupled to the process fluid using a long capillary tube. The capillary tube can run many feet and an isolation fluid is carried in tube. One end of the tube mounts to the process through an isolation diaphragm and the other end of the tube couples to the pressure transmitter. This long capillary tube and isolation diaphragm is generally referred to as a "remote seal."

The use of a remote seal configuration increases the cost and complexity of the installation and reduces the accuracy of the pressure measurements. Further, the additional components provide another source of possible failure of the device.

SUMMARY

An isolation assembly for connection to a process transmitter and for mitigating high temperature effects of process fluid includes a process coupling face having an isolation diaphragm configured to contact process fluid. The isolation assembly further includes a transmitter coupling having a pressure coupling configured to couple to a pressure port of the process transmitter. An isolation fluid conduit extends between the process coupling face and the transmitter coupling and carries an isolation fluid which couples the isolation diaphragm to the pressure coupling.

BRIEF DESCRIPTION OF THE DRAWINGS

FIG. 2A is a side plan view of a pressure transmitter including an isolation assembly in accordance with the present invention.

FIG. 2B is another side plan view of the assembly of FIG. 2A.

FIG. 2C is a bottom plan view of the isolation assembly of FIGS. 2A and 2B.

FIG. 2D is a top plan view of the isolation assembly of FIGS. 2A and 2B.

DETAILED DESCRIPTION

Figure 1:
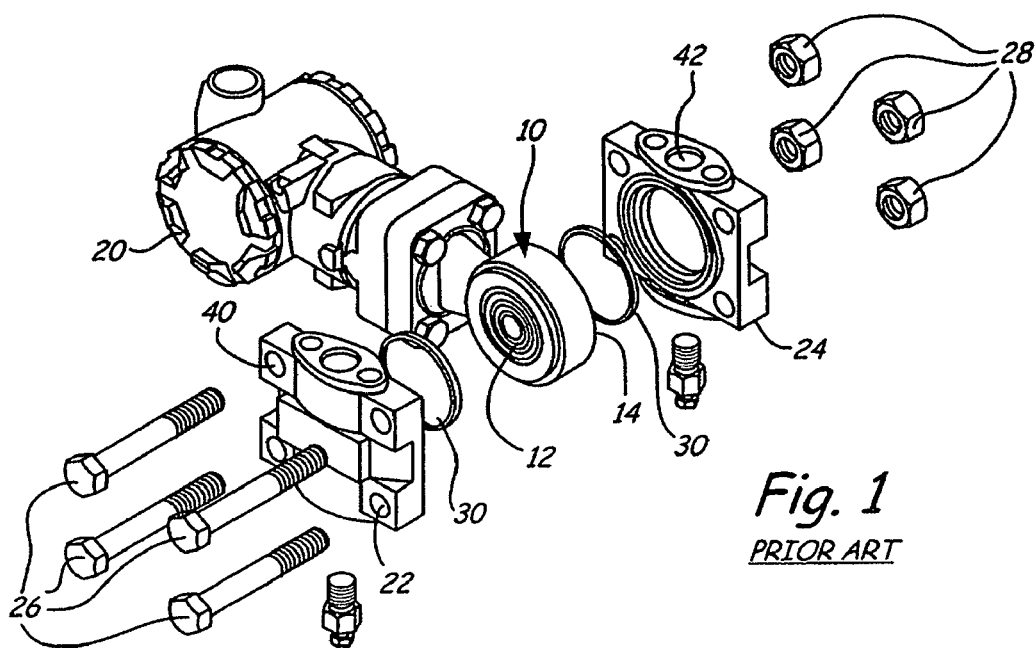
FIG. 1 is an exploded view of a prior art transmitter assembly.

FIG. 1 is a partial exploded view of a prior art transmitter isolation assembly 10. Assembly 10 includes diaphragms 12 and 14 (not shown) and couples to a differential pressure transmitter 20. Flanges 22 and 24 bolt onto the diaphragms 12 and 14 using bolts 26 and nuts 28. O-rings 30 are provided to seal the coupling. The flanges 22 and 24 couple to process piping through process connections 40 and 42, respectively. Pressure transmitter 20 includes two isolation diaphragms (not shown) which generally lie in the same plane. Two conduits (not shown) carried within isolation assembly 10 couple each diaphragm 12 and 14 to one of the isolation diaphragms of the transmitter 20. In the prior art configuration shown in FIG. 1, the two diaphragms 12 and 14 have their faces opposed to each other and lie in different parallel planes. In contrast, the two isolation diaphragms on the pressure transmitter 20 lie in the same plane. Therefore, process couplings which are configured to couple to the isolation diaphragm configuration of transmitter 20, are incompatible with the opposed isolation diaphragm configuration provided by isolation assembly 10.

FIG. 2A is a first side plan view, 2B is a second side plan view, FIG. 2C is a bottom plan view and FIG. 2D is a top plan view of a process transmitter isolation assembly 52 in accordance with the present invention. In FIGS. 2A and 2B, the isolation assembly 52 is shown coupled to a differential pressure process transmitter 50. As with the process transmitter shown in FIG. 1, transmitter 50 includes two isolation diaphragms (not shown) which lie in the same plane. Transmitter isolation assembly 52 couples to transmitter 50 through bolts 54 which extend through bolt holes 56. As shown in FIG. 2D, isolation assembly 52 includes a process coupling face 60 having a first pressure coupling 62 and a second pressure coupling 64 configured to couple to the isolation diaphragm 61 and 63 of the pressure transmitter. The pressure couplings 62 and 64 can comprise openings in the process coupling face configured to seal against the isolation diaphragms of the transmitter 50.

Opposite the transmitter coupling face 60 is a process coupling face 70 illustrated in FIG. 2C. The process coupling face 70 includes a first isolation diaphragm 72 and a second isolation diaphragm 74 configured to contact process fluid. Bolt holes 76 are provided for coupling the isolation diaphragm assembly 52 to a mounting assembly.

The process coupling face 70 is carried on a process mount 80 and the transmitter coupling face 60 is carried on a transmitter mount 82. Coupling face 70 is configured to mount to a process coupling flange 71 shown in FIG. 2A. It is appreciated that extension section 84 is configured to reduce transfer of heat or thermal energy from the process fluid to the transmitter. The specific dimension of extension section 84 depend on the particular parameters (such as temperature) of the process fluid to be measured. An extension section 84 extends between mounts 80 and 82. Conduits 86 and 88 are shown in phantom. Conduit 86 extends between isolation diaphragm 72 and pressure coupling 62. Conduit 88 extends between isolation diaphragm 74 and pressure coupling 64. The conduits 86 and 88 are filled with a isolation fluid such as oil which is substantially incompressible. The fill fluid is introduced into conduits 86 and 88 after isolation assembly 52 is sealed to transmitter 50 through fluid fill ports 96 and 98 shown in FIG. 2a. When a process pressure is applied diaphragm 72 or 74, it is transferred through the fill fluid within conduits 86 and 88 to the respective pressure coupling 62 and 64 and to the isolation diaphragms 61 and 63 of transmitter 50.

Figure 3:
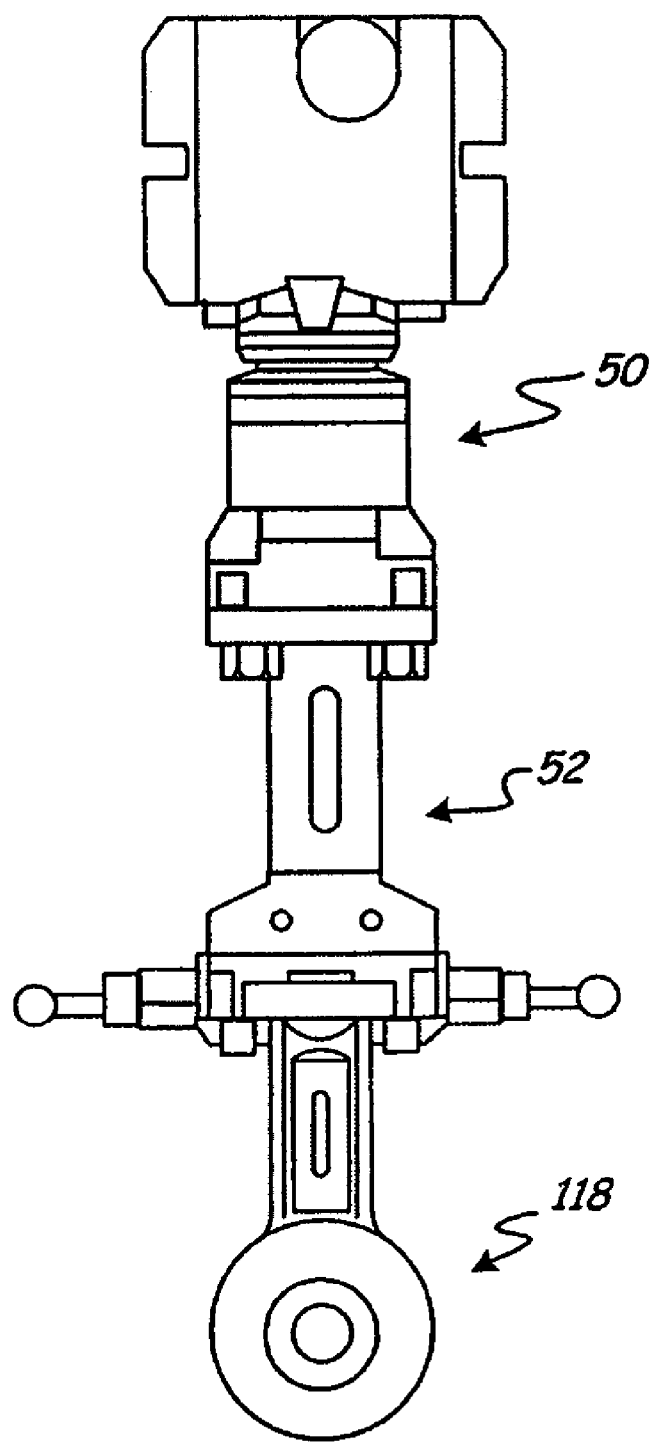
FIG. 3 is a perspective view of a transmitter coupled to a compact orifice plate assembly through an isolation assembly.

In the configuration shown in FIGS. 2A-2D, the isolation diaphragms 72 and 74 of the pressure transmitter isolation assembly 52 can be arranged to be in a similar configuration, such as lying in the same plane and having the same spacing and dimensions, as the isolation diaphragms of transmitter 50. With such a configuration, hardware which is configured to mount directly to pressure transmitter 50, such as a compact orifice plate assembly 118 as shown in FIG. 3 or a flange 71 as shown in FIGS. 2A and 2B, can also be used to mount to the process coupling face 70 of isolation assembly 52 without any modifications. The coupling of isolation assembly 52 to transmitter 50 can be through any appropriate technique such as welding or others. It is also appreciated that in one preferred embodiment, the isolation couplings 62, 64 lie in a plane parallel to isolation diaphragms 72, 74.

Figure 4:
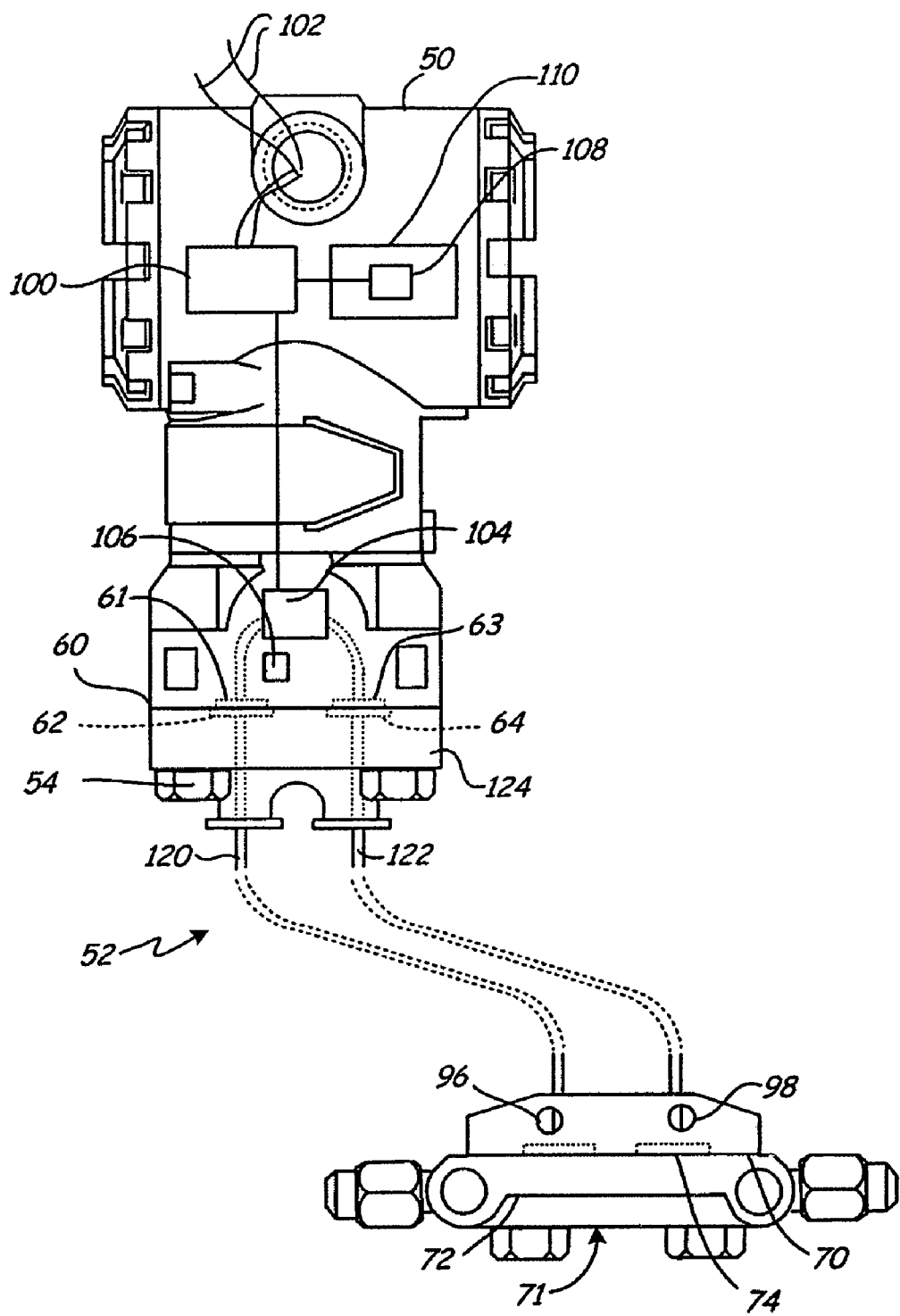
FIG. 4 is a perspective view of a configuration using flexible conduits.

FIG. 4 is a side view of another example embodiment of transmitter 50 coupled to flange 71 in a configuration in which flange 71 is spaced apart from the isolation diaphragms 61-63 of transmitter 50. In the configuration of FIG. 4, a solid isolation assembly is not required. Instead, the isolation assembly can be formed by two flexible conduits 120 and 122 which extend between a transmitter flange 124 and process coupling flange 71. In the configuration of FIG. 4, the conduits are illustrated as running separately. However, in a similar configuration, conduits 120 and 122 can be carried together. Additionally, the conduits 120 and 122 can be carried in a flexible support structure to provide additional strength. Such a configuration increases the number of mounting configurations because the transmitter 50 does not need to be physically located adjacent the process coupling flange 71. Such a configuration can also provide increased thermal insulation.

The present invention also includes a method of temperature characterization of a pressure transmitter while it is coupled to an isolation assembly such as isolation assembly 52. In accordance with the method, the assembled transmitter 50 and isolation assembly 52 is subjected to a characterization procedure which is typically used with transmitter 50 alone. In the characterization procedure, various pressures are applied to isolation diaphragm 62 and 64 while the assembled unit (transmitter 50 and isolation assembly 52) is exposed to different temperatures. The output of the device is monitored during this characterization process. A comparison can be performed between the actual output and the expected output while the transmitter is subjected to these different temperatures and pressures. A correction formula can be used within the transmitter to correct for the errors introduced due to temperature variations. For example, a polynomial equation can be used and the coefficients of the polynomial can be determined through the characterization process.

This method allows the entire assembled unit (transmitter 50 and isolation assembly 52) to be characterized across a temperature range. In contrast, in a typical remote seal type configuration, the assembled unit cannot be characterized because of size constraints in the remote seal/transmitter combination and the fact that the remote seals are often assembled and filled at a location other than the transmitter manufacturing factory. Thus, they do not lend themselves to be re-characterized after the remote seal has been installed.

During operation, transmitter circuitry 100 provides a pressure related output on two wire process control loop 102 as a function of pressure sensed by pressure sensor 104, temperature sensed by temperature sensor 106 and compensation coefficients 108. The compensation coefficient 109 can be determined using the method discussed above and stored in a memory 110. This provides temperature compensation of the output as a function of the temperature of transmitter 50 and isolation assembly 52. The compensation coefficients can be, for example, coefficients of a polynomial.

The isolation assembly of the present invention can be filled with any type of desired fill fluid. For example, when the assembly is used in a food processing environment, the fill fluid can be of a non-toxic material such as a vegetable oil. As the fill fluid in the isolation assembly does not contact the pressure sensor in transmitter 50, the fill fluid in isolation assembly 50 is not restricted to having particular electrical characteristics.

Although the present invention has been described with reference to preferred embodiments, workers skilled in the art will recognize that changes may be made in form and detail without departing from the spirit and scope of the invention.

What is claimed is:

1. An isolation assembly for connection with a process transmitter and for mitigating high temperature effects of a process fluid, comprising:
    a process coupling face having a first isolation diaphragm extending in a first plane and configured to contact process fluid;
    a transmitter coupling having a first pressure coupling extending in a second plane and configured to couple to a first pressure port of the process transmitter;
    a first temperature isolation conduit extending between the process coupling face and the transmitter coupling which couples the first isolation diaphragm to the first pressure coupling such that the thermal conduction path of the process fluid is increased between the process coupling face and the transmitter coupling; and
    an isolation fill fluid in the first conduit configured to transfer an applied pressure from the first isolation diaphragm to the first pressure coupling.

2. The apparatus of claim 1 wherein the first and second conduits are flexible.

3. The apparatus of claim 1 wherein the first and second conduits are carried in an extension section.

4. The apparatus of claim 3 wherein the extension section is sized to reduce transfer of thermal energy from the process fluid to the transmitter to prevent interruption of transmitter operation due to high temperature of the process fluid.

5. The apparatus of claim 1 wherein the first and second isolation diaphragms and the first and second pressure couplings lie in parallel planes.

6. The apparatus of claim 1 wherein a size and spacing of the first and second isolation diaphragms of the process coupling face have substantially the same as size and spacing of isolation diaphragms of the transmitter.

7. The apparatus of claim 6 wherein the process coupling face includes a plurality of bolt holes and wherein the plurality of bolt holes have a size and spacing similar to bolt holes in the transmitter.

8. The apparatus of claim 1 wherein the process coupling face includes a second isolation diaphragm, the transmitter coupling includes a second pressure coupling and the apparatus further including a second temperature isolation conduit extending between the process coupling face and the transmitter coupling which couples the second isolation diaphragm to the second pressure coupling.

9. A pressure transmitter assembly, comprising:
    a pressure transmitter having an isolation diaphragm configured to couple to a pressure and having an output related to pressure applied to the isolation diaphragm;
    an isolation assembly configured to mount to the isolation diaphragm of the pressure transmitter and having a process coupling isolation diaphragm configured to couple to a process pressure and transfer the process pressure to the pressure transmitter isolation diaphragm; and
    wherein the output from the pressure transmitter is compensated based upon temperature characterization of the pressure transmitter and of the isolation assembly.

10. The apparatus of claim 9 wherein the isolation assembly includes an extension section extending between a process coupling face which carries the process coupling isolation diaphragm and a pressure transmitter coupling face, the extension section including a conduit therein, the conduit filled with an isolation fluid.

11. The apparatus of claim 9 wherein the pressure transmitter includes a second isolation diaphragm and the isolation assembly includes a second process fluid isolation diaphragm and a second conduit extending therebetween filled with isolation fluid.

12. A method of reducing heat transfer between a process fluid and a pressure transmitter, comprising:
    coupling a process coupling face of an isolation assembly to a process pressure;
    coupling a pressure transmitter to a pressure transmitter coupling of the isolation assembly;
    applying a process pressure to an isolation diaphragm of the isolation assembly and transmitting the applied pressure to an isolation diaphragm of the pressure transmitter through an isolation fluid in the isolation assembly.

13. The method of claim 12 wherein the process coupling face includes a second isolation diaphragm configured to contact the process fluid, the first and second isolation diaphragms extending generally in the same plane.

14. The method of claim 12 wherein the transmitter coupling includes a second pressure coupling configured to couple to a second pressure port of the process transmitter.

15. The method of claim 12 wherein the extension section includes a second isolation fluid conduit which couples the second isolation diaphragm to the second pressure coupling.

16. The method of claim 12 wherein a size and spacing of the first and second isolation diaphragms of the process coupling face have substantially the same as size and spacing of isolation diaphragms of the transmitter.

17. The method of claim 12 wherein the process coupling face includes a plurality of bolt holes and wherein the plurality of bolt holes have a size and spacing similar to bolt holes in the transmitter.

18. A method of characterizing a sensed pressure applied to a pressure transmitter as a function of temperature, comprising:
    coupling a temperature isolation assembly to the pressure transmitter;
    applying a pressure to an isolation diaphragm of the isolation assembly and thereby applying the pressure to an isolation diaphragm of the transmitter by conveying the applied pressure through an isolation fluid in the isolation assembly to the isolation diaphragm of the pressure transmitter;
    changing the temperature of the pressure transmitter and isolation assembly; and
    characterizing an output of the pressure transmitter as a function of applied pressure and temperature.

19. The method of claim 18 including storing characterization coefficients in a memory of the pressure transmitter which relate pressure and temperature to the output of the transmitter.

20. The method of claim 19 wherein the characterization coefficients comprise coefficients of a polynomial.

21. The method of claim 18 wherein the applied pressure comprises a differential pressure.

* * * * *